United States Patent
Bijnens et al.

(10) Patent No.: US 6,779,244 B1
(45) Date of Patent: Aug. 24, 2004

(54) METHOD FOR PRODUCTION OF A WINDSCREEN WIPER ARM WITH A U-PROFILE CROSS-SECTION AND THE CORRESPONDING DEVICE

(75) Inventors: Marc Bijnens, Zutendaal (BE); Paul Criel, Truiden (BE)

(73) Assignee: Robert Bosch GmbH, STuttgart (DE)

( * ) Notice: Subject to any disclaimer, the term of this patent is extended or adjusted under 35 U.S.C. 154(b) by 473 days.

(21) Appl. No.: 09/869,224

(22) PCT Filed: Oct. 7, 2000

(86) PCT No.: PCT/DE00/03533
§ 371 (c)(1),
(2), (4) Date: Jan. 8, 2002

(87) PCT Pub. No.: WO01/30620
PCT Pub. Date: May 3, 2001

(30) Foreign Application Priority Data

Oct. 26, 1999 (DE) .......................... 199 51 468

(51) Int. Cl.[7] .......................... B21J 15/02; B23P 11/00; B23P 21/00
(52) U.S. Cl. ...................... 29/525.06; 29/432; 29/432.1; 29/432.2; 29/715
(58) Field of Search .............................. 29/525.06, 432, 29/432.1, 432.2, 438, 464, 505, 512, 700, 715, 716; 15/250.32; 403/163

(56) References Cited

U.S. PATENT DOCUMENTS

| | | | | |
|---|---|---|---|---|
| 3,733,642 A | * | 5/1973 | Schmid | 15/250.32 |
| 4,224,001 A | * | 9/1980 | Arndt et al. | 403/163 |
| 5,715,563 A | * | 2/1998 | Marks | 15/250.32 |

FOREIGN PATENT DOCUMENTS

| | | |
|---|---|---|
| DE | 196 15 867 A | 10/1997 |
| EP | 0 792 704 A | 9/1997 |

* cited by examiner

Primary Examiner—John C. Hong
(74) Attorney, Agent, or Firm—Michael J. Striker

(57) ABSTRACT

A method for producing a windshield wiper bracket (10) with a U-shaped cross section, with two through holes (12) disposed in the legs (11) of the bracket (10), through which a rivet (13) extends, wherein the method includes the following steps:

production of through holes (12) in a flat bracket blank (14);

insertion of a rivet slug (15) into one of the through holes (12);

folding of the legs (11) to produce the U-shaped profile and to thereby position the rivet slug (15) in a position aligned with the other through hole (12);

sliding of the rivet slug (15) into the position extending through both of the through holes (12), and riveting of the rivet slug (15).

17 Claims, 6 Drawing Sheets

METHOD FOR PRODUCTION OF A WINDSCREEN WIPER ARM WITH A U-PROFILE CROSS-SECTION AND THE CORRESPONDING DEVICE

BACKGROUND OF THE INVENTION

The invention relates to a method for producing a windshield wiper bracket of U-shaped cross section, with two through holes disposed in the legs of the bracket, through which a rivet extends.

The invention also relates to an apparatus for producing windshield wiper bracket of U-shaped cross section, where the apparatus includes folding means for producing a U-shaped profile from a flat bracket blank provided with two through holes, a positioning mechanism for sliding a rivet slug into the through holes, which are aligned with each other after production of the U-shaped profile, and deformation means for producing at least one rivet head on the rivet slug, according to the preamble to claim 8.

Methods for producing a windshield wiper bracket of U-shaped cross section are known. With these known methods, a U-shaped bracket, whose two legs are provided with through holes that are aligned with each other, is formed in a first station. In a second station, a rivet slug is inserted through the two mutually aligned through holes in the U-shaped bracket in such a way that a free end of the rivet slug protrudes out from the corresponding through hole of the bracket. Then in a separate work cycle, the respective end of the rivet slug is wobbled to form a rivet head. This method for producing a U-shaped bracket with a rivet is relatively complex and time-consuming.

It is also known to provide a bracket, which is U-shaped and suitably embodied, with a roll rivet. In order to produce a roll rivet, the legs of the U-shaped bracket are disadvantageously weakened by means of suitable excisions so that an undesirable fracture of the roll rivet connection on the bracket can occur during operation of the windshield wiper. The roll rivet breaking off from the bracket like this can, for example, be caused by an occurrence of material fatigue. This known method for producing a U-shaped bracket while forming a roll rivet is also disadvantageously complex and time-consuming.

SUMMARY OF THE INVENTION

The method according to the invention includes the following steps:
 production of through holes in a flat bracket blank;
 insertion of a rivet slug into one of the through holes;
 folding of the legs to produce the U-shaped profile and to thereby position of the rivet slug in a position aligned with the other through hole;
 sliding of the rivet slug into the position extending through both of the through holes, and
 riveting of the rivet slug.

By inserting a rivet slug into one of the two through holes of a flat bracket blank before the folding of the legs, it is possible to bring the rivet slug into the desired position aligned with regard to the two through holes while simultaneously producing the bracket with the U-shaped cross section. It is also possible to execute the sliding of the rivet slug into the position that extends through both through holes, together with the folding of the legs and the positioning of the rivet slug in one continuous work step by means of a single, suitably embodied tool. The production of a bracket with a U-shaped cross section while forming a rivet can consequently take place in a single manufacturing or processing station.

Preferably, the rivet slug is fixed in position in the bracket blank. This assures that the rivet slug is disposed in a definite position before and during the folding of the legs to produce the U-shaped profile of the bracket. Is also possible to use preassembled flat bracket blanks, each provided with the rivet slug fixed in position, in order to produce brackets with U-shaped cross sections for windshield wipers.

In order to fix it in position, the rivet slug is advantageously pressed into the through hole of the flat bracket blank, forming a press fit. A position fixing of the rivet slug in one of the two through holes of the bracket blanks by means of a press fit can be produced simply and reliably from a production engineering standpoint. The strength of the press fit between the rivet slug and bracket blank can be adapted with relative ease to each intended application, i.e. depending on the wall thickness of the bracket blank and the diameter of the rivet slug. As a result, in particular the method steps of sliding and riveting of the rivet slug can be controlled and/or adjusted in a reliable and effective manner. Furthermore, using a press fit to fix the position of the rivet slug assures that after the folding of the legs and during the sliding of the rivet slug, it aligns exactly with the other through hole and no shifting of the rivet slug in relation to the through holes occurs, which would hinder the sliding of the rivet slug.

Preferably by means of an entry bevel in operational contact with a rivet edge, the rivet slug is pushed into the other through hole of the U-shaped bracket until the rivet slug protrudes out from the through holes with its ends. Because of the definite starting position (press fit) of the rivet slug in one of the through holes of the bracket blank, it is possible after the folding of the legs, to easily and reliably slide the rivet slug out of its initial position into the end position extending through both of the through holes. In this connection, it is particularly important that the rivet slug protrudes out from the through holes in the end position so that it is possible to produce rivet heads (riveting of the rivet slug). From a production engineering standpoint, an entry bevel is relatively easy and inexpensive to produce in a corresponding manufacturing tool.

According to a preferred embodiment, the ends of the rivet slug protruding out from the U-shaped bracket are plastically deformed by means of a wobbling process to form a respective rivet head. From a process engineering standpoint, it is particularly favorable to form rivet heads on the free ends of the rivet slug protruding out from the through holes of the bracket with the U-shaped cross section, preferably simultaneously by means of a wobbling process. As a result, the bracket with the U-shaped cross section, with the rivet slug disposed in the aligned position, can maintain its original position and does not have to be brought into a special and/or new working position for the formation of the rivet heads. A wobbling process for producing a rivet head is particularly advantageous with regard to a correct and controllable material deformation on the corresponding rivet slug end. The desired and/or necessary exertion of force and consequently the material deformation for producing the rivet head can be adapted to each intended application by suitably varying the wobbling process (deformation force, adjustment angle, wobbling speed).

Advantageously, the two ends of the rivet slug are plastically deformed simultaneously. The formation of both of the ends protruding out from the through holes of the bracket into respective rivet heads permits a rapid and effective rivet production on the bracket with the U-shaped cross section.

Advantageously, the rivet slug is stabilized in its shaft part between the legs during the plastic deformation of the two ends. This effectively prevents the rivet slug from buckling during the production of the rivet heads. It is consequently easily possible to produce a correct and particularly stable rivet connection between the legs of the bracket.

According to the invention, the apparatus is characterized in that the folding means, the positioning mechanism, and the deformation means are disposed in a single processing station. The production of a bracket with a U-shaped cross section and a rivet contained in it in a single processing station is particularly favorable from a production engineering standpoint because this eliminates the transport time and/or waiting time that would otherwise occur during the manufacturing process. Furthermore, a folding of the legs, and a sliding and riveting of the rivet slug in a single processing station permits a bracket to be produced with relative ease while fulfilling particularly high precision requirements since the manufacturing tolerances in the bracket and/or the rivet, which arise due to the use of a number of processing means working in various stations, can be completely or at least partially eliminated. Furthermore, the manufacturing means used can be disposed in a single station in a particularly space-saving manner.

Advantageously, the folding means are embodied as dies which can be moved toward and away from each other in a linear fashion. Dies are tools which are particularly well suited for folding the legs to produce a profile with a U-shaped cross section since they can be produced with relative ease and can be favorably adapted to various intended applications through corresponding geometric embodiments.

The positioning mechanism is advantageously embodied as an entry bevel on one of the dies. The die provided with the entry bevel therefore simultaneously has two different operating functions, namely folding the legs to produce the U-shaped profile and sliding the rivet slug into the position extending through both through holes. From a production engineering standpoint, it is particularly easy to produce an entry bevel on one of the dies. Furthermore, an entry bevel on a die permits a relatively exact and reliable sliding of the rivet slug into the desired final position in the bracket.

Preferably, the deformation means are embodied as movable deformation elements. Movable deformation elements permit a precise deformation of the ends of the rivet slug protruding out from the through holes into respective rivet heads and this deformation can be adapted to the respective intended application.

According to a preferred embodiment, the entry bevel is embodied as a linear, straight guide edge. Using a linear, straight guide edge as the entry bevel assures a continuous sliding of the rivet slug into the position extending through both through holes. In an alternative embodiment and depending on the respective intended application, the entry bevel can also be embodied as a curved guide edge.

Preferably, the deformation elements are embodied as cups which execute a wobbling motion. In this manner, it is possible for the ends of the rivet slug protruding out from the through holes to be plastically deformed into rivet heads by means of a wobbling process. In this connection, the wobbling motion of the cups, i.e. in particular the adjustment angle and the deformation force, can be adapted to the respective material and/or geometrical parameters of the rivet slug and/or the bracket with the U-shaped cross section.

The apparatus advantageously has a stabilization mechanism for the rivet part disposed between the legs of the U-shaped profile during the production of the rivet head. The stabilization mechanism prevents the rivet slug from buckling in its rivet part disposed between the legs of the U-shaped profile during the production of the rivet head due to the processing forces being exerted.

The dies are advantageously provided with a recess in the pivot region of the rivet slug. Providing a recess in the dies prevents the rivet slug that is inserted into one of the two through holes of the flat bracket blank from colliding with the die bodies during the folding of the legs to produce the U-shaped profile, since the rivet slug also necessarily executes a pivoting motion during the folding of the legs.

Preferably, the apparatus is operatively connected to a vibrator for supplying rivet slugs. Using a vibrator is a particularly reliable way to supply the apparatus with a large number of rivet slugs in succession, rapidly and in a definite position.

The apparatus advantageously has a reference element for the exact positioning of the flat bracket blank between the dies. In order to obtain a precise alignment of the two through holes after the production of the U-shaped profile, the flat bracket blank must be disposed in a correspondingly precise position with regard to the dies. In this connection, it is particularly advantageous to provide a reference element which comes into contact with a reference point or a reference line of the flat bracket blank and consequently permits an exact positioning of the flat bracket blank between the dies. A reference point or a reference line can be disposed on an edge of one of the through holes or another opening and/or edge of the flat bracket blank.

Other advantageous embodiments of the invention ensue from the description.

BRIEF DESCRIPTION OF THE DRAWINGS

The invention will be explained in detail below in an exemplary embodiment in conjunction with accompanying drawings.

DESCRIPTION OF THE PREFERRED EMBODIMENTS

Figure 1:
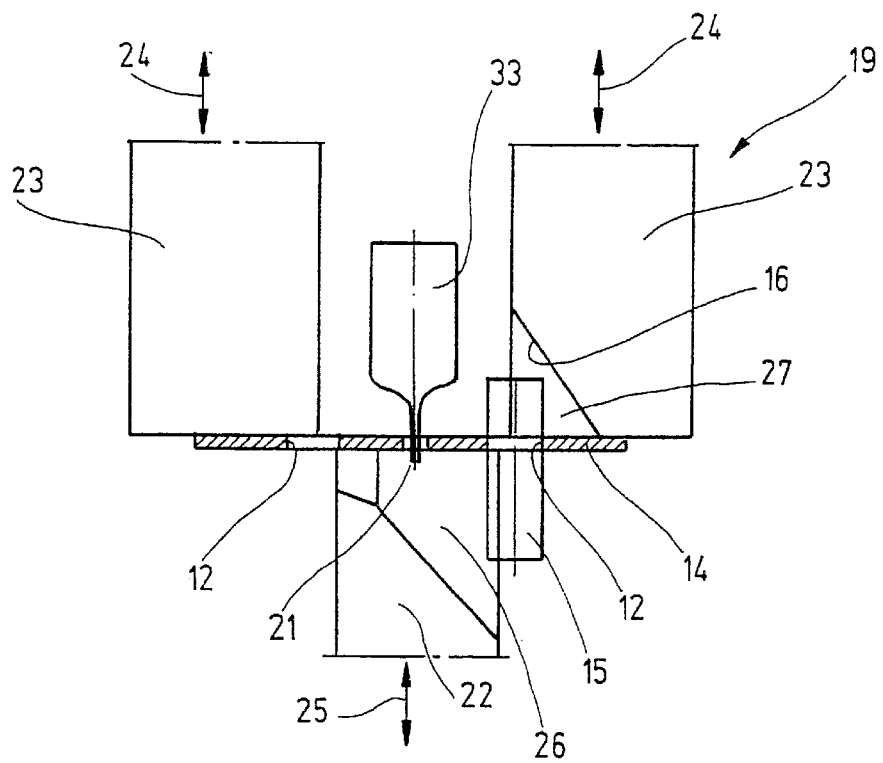
FIG. 1 is a schematic side view of an apparatus according to the invention, with a flat bracket blank.
Figure 2:
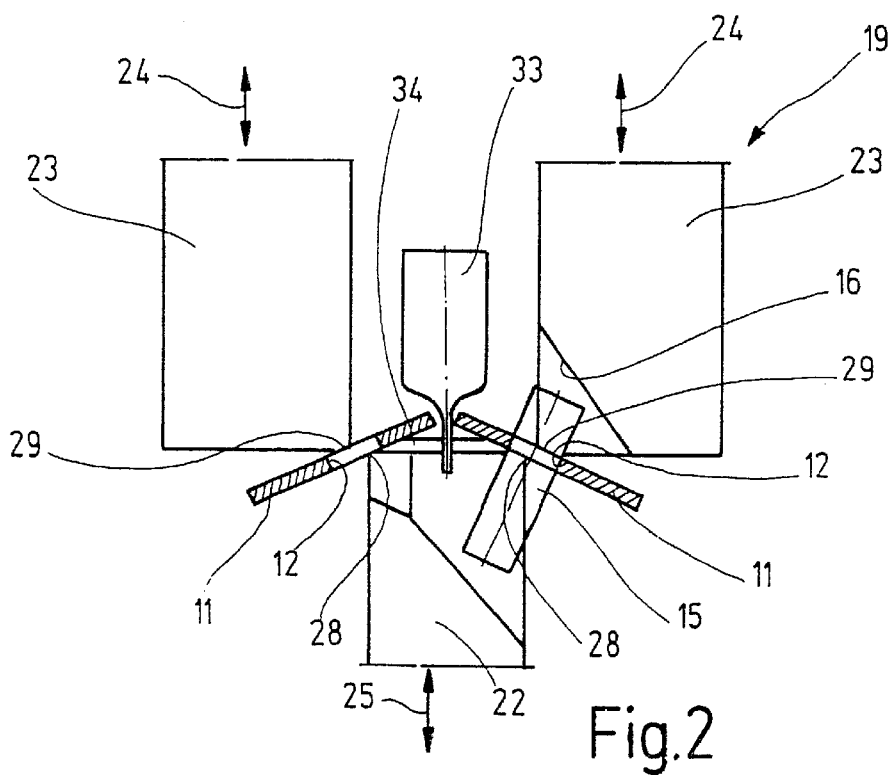
FIG. 2 is a schematic side view of the apparatus according to FIG. 1, during the folding of the bracket blank.
Figure 3:
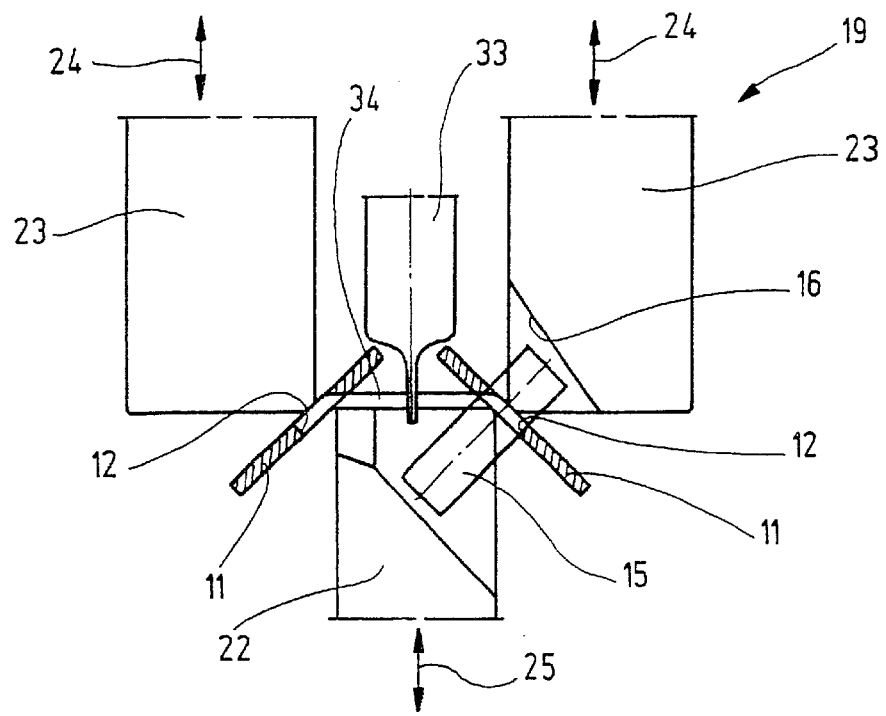
FIGS. 3 and 4 are schematic side views of the apparatus according to FIG. 2, with continuing folding of the bracket blank.
Figure 4:
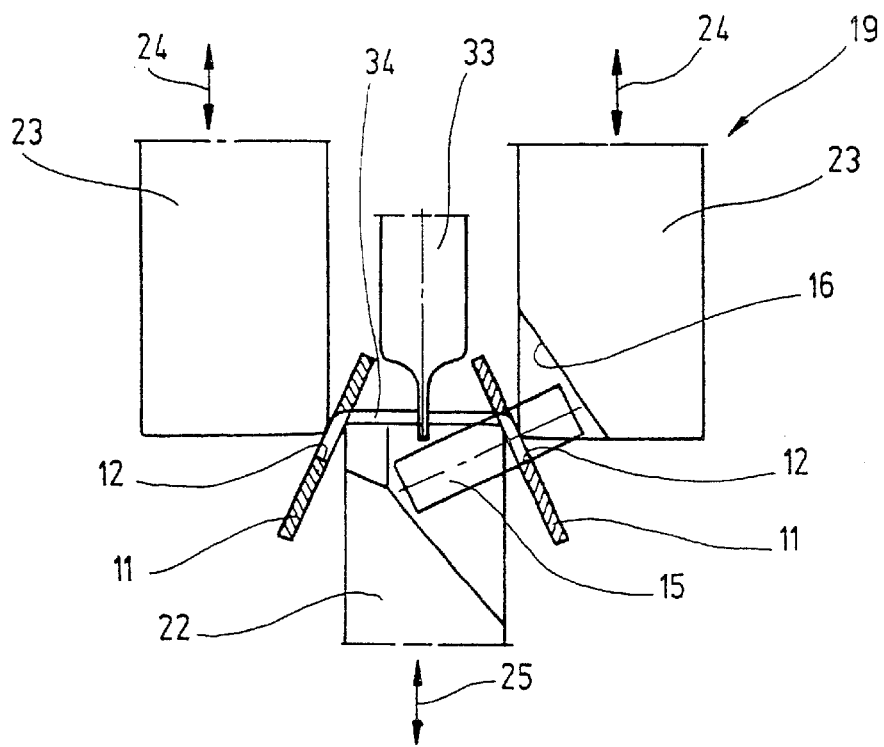
Figure 5:
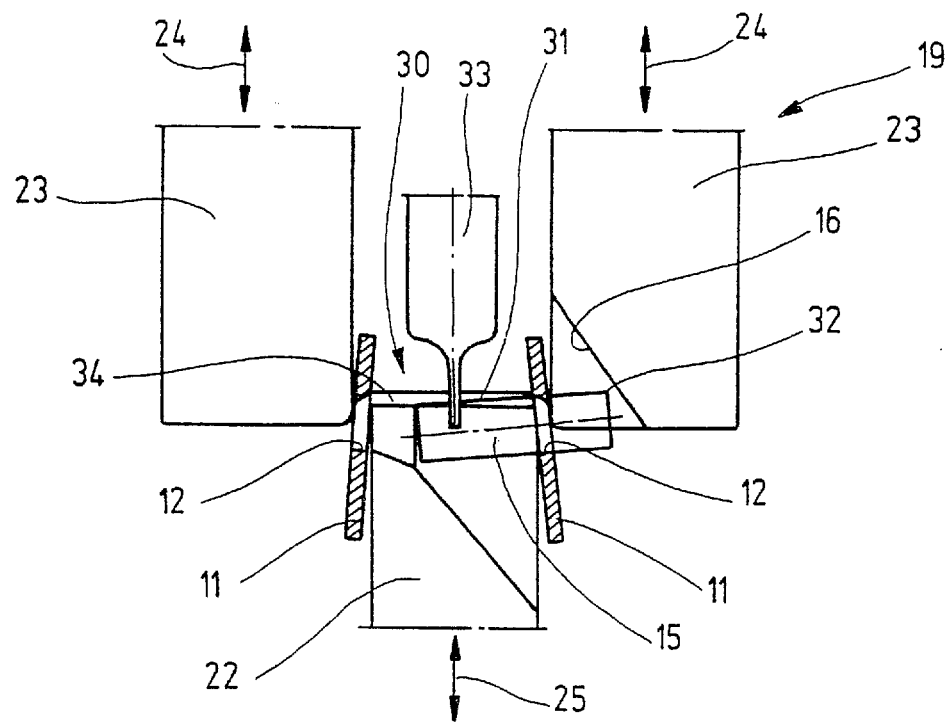
FIG. 5 is a schematic side view of the apparatus according to FIG. 4, with an almost completed folding of the bracket blank.

FIG. 1 shows a flat bracket blank 14 which is provided with two through holes 12 that are spaced apart from each other. A rivet slug 15 is fixed in position in one of the two through holes 12, by means of a press fit. The flat bracket blank 14 is secured by an apparatus 19, which includes two upper dies 23 and one lower die 22, in such a way that a central section of the bracket blank 14 rests against an end face of the lower die 22 and two lateral outer sections of the bracket blank 14 protrude beyond the end face of the lower die 22. The upper dies 23 of the apparatus 19, which are disposed opposite from the lower die 22 and laterally spaced apart from it, rest with their corresponding end faces against the lateral sections of the flat bracket blank 14, which protrude out beyond the lower die 22. The lower die 22 and the two upper dies 23 can be moved toward and away from each other in accordance with the arrows 24 and 25 simultaneously or successively in such a way that the flat bracket blank 14 disposed between the lower die 22 and the upper dies 23 can be deformed into a bracket 10 with a U-shaped cross section. In the vicinity of the rivet slug 15, the lower die 22 and the corresponding upper die 23 are each provided with a suitable recess 26, 27 in order to prevent an undesirable collision of the rivet slug 15 with the dies 22, 23 resting against the bracket blank 14 during the deformation of the flat bracket blank 14 into a bracket 10 with a U-shaped cross section.

Figure 9:
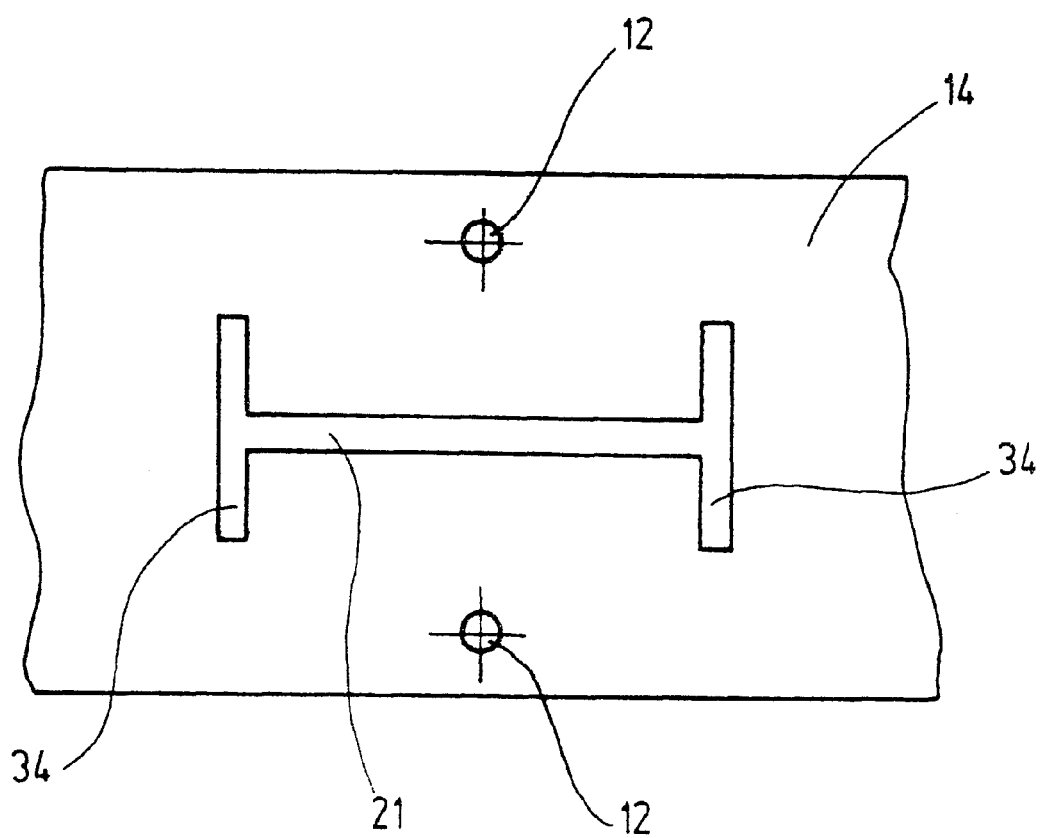
FIG. 9 is a schematic top view of a detail of the flat bracket blank according to FIG. 1.

As shown in FIG. 9, the flat bracket blank 14 has a central, longitudinal, slot-like through opening 21 and two transversal, slot-like through openings 34. The longitudinal through opening 21 and the two transversal through openings 34 are directly connected to each other and combine to form an H-shape, where the two through holes 12 are disposed on a common transversal axis between the two transversal through openings and spaced equidistantly apart from the longitudinal through opening 21. Both the through holes 12 and the through openings 21, 34 can be produced by being suitably punched out of the flat bracket blank 14. Preferably, such a punch processing of the flat bracket blank 14 takes place in a processing station separate from the apparatus 19.

According to FIG. 1, the apparatus 19 has a reference element 33, which is disposed between the two upper dies 23 and protrudes with a free end into the central, longitudinal through opening 21 of the flat bracket blank 14 in order to assure an exact disposition of the flat bracket blank 14 symmetrical to the dies 22, 23. In the current exemplary embodiment, the free end of the reference element 33 protrudes through the longitudinal through opening 21 into the recess 26 of the lower die 22, where the reference element 33 is embodied in such a way that a collision between the bracket blank 14 and the reference element 33 is prevented while the flat bracket blank 14 is being deformed into a U-shaped bracket 10.

FIGS. 2 to 5 show different phases of the folding of two legs 11 of the initially flat bracket blank 14 (see FIG. 1) in order to produce a desired U-shaped profile. To this end, the lower die 22 and/or the two upper dies 23 are moved toward one another according to the arrows 24, 25 so that as a result of the deformation force introduced into the bracket blank 14 by the deformation edges 28 of the lower die 22 and by the respective deformation edge 29 of the upper dies 23, the legs 11 of the bracket 10 are plastically bent and pivoted in such a way that the originally flat bracket blank 14 (see FIG. 1) is formed into a bracket 10 with a U-shaped cross section (see FIG. 5). With this plastic deformation of the flat bracket blank 14 into a U-shaped profile, the rivet slug 15 that is fixed in position in one of the two through holes 12 is pivoted from an initial position (see FIG. 1) by preferably 90° in accordance with the movement of the legs 11 in such a way that it assumes a position that is aligned with the two through holes 12. During the folding of the legs 11 to produce the U-shaped profile according to FIGS. 2 to 5, an access opening 30 is unblocked (see FIG. 5) whose longitudinal span corresponds to that of the longitudinal through opening 21 and whose lateral span corresponds to the length of the transversal through opening 34. As a result, the length of the transversal through openings 34 extends over the entire width of the top edge 31 of the bracket 10 with the U-shaped cross section. Because of an access opening 30, which is embodied in this way and can be obtained through suitable preparation of the flat bracket blank 14 (through openings 21, 34), it is possible for the legs 11 of the bracket 10 not to be exposed to any plastic deformation in the vicinity of the rivet slug 15, but instead to be pivoted as flat edges from a horizontal starting position shown in FIG. 1 into a vertical end position according to FIG. 6.

Figure 6:
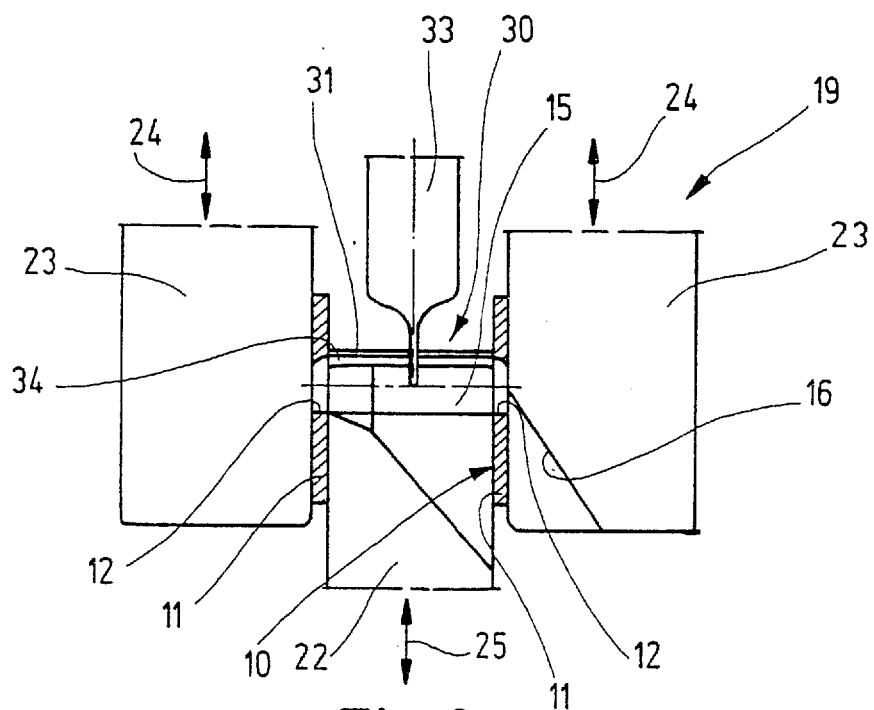
FIG. 6 is a schematic side view of the apparatus according to FIG. 5, with a rivet slug in a position aligned with two through holes of the bracket blank.

Immediately after the folding of the legs 11 to produce the U-shaped profile and the positioning of the rivet slug 15 in a position that is aligned in relation to the two through holes 12, further movement of the lower die 22 and/or the upper dies 23 toward one another according to the arrows 25, 24 causes the rivet slug 15, which is fixed in position in one of the two through holes 12 by means of a press fit, to be slid toward the other through hole 12. FIG. 6 shows the apparatus 19 and the U-shaped bracket 10 after the rivet slug 15 has been slid into the other through hole 12 of the bracket 10 with the U-shaped cross section. This sliding of the rivet slug 15 is caused by an entry bevel 16 on one of the upper dies 23, which comes into operative contact with a contact edge 32 of the rivet slug 15 when there is a relative motion between the dies 22, 23 according to the arrows 24, 25. With this operative contact, the entry bevel 16, which is inclined in relation to the rivet slug 15 end face containing the contact edge 32, transmits a corresponding compressive force onto the contact edge 32 with a sliding motion of the lower die 22 and/or the upper dies 23 according to the arrows 25, 24. Because of this compressive force transmitted to the contact edge 32 by the entry bevel 16, the rivet slug 15 is slid by means of the one through hole 12 (press fit) in such a way that its free end disposed inside the U-shaped profile enters into the second, aligned through hole 12 of the bracket 10. As a result, the rivet slug 15 is slid, aligned with the through holes 12, until both of its free ends protrude out from the two through holes 12 (not shown in FIG. 6). In the current exemplary embodiment, the entry bevel 16 is embodied as a linear, straight guide edge.

Figure 7:
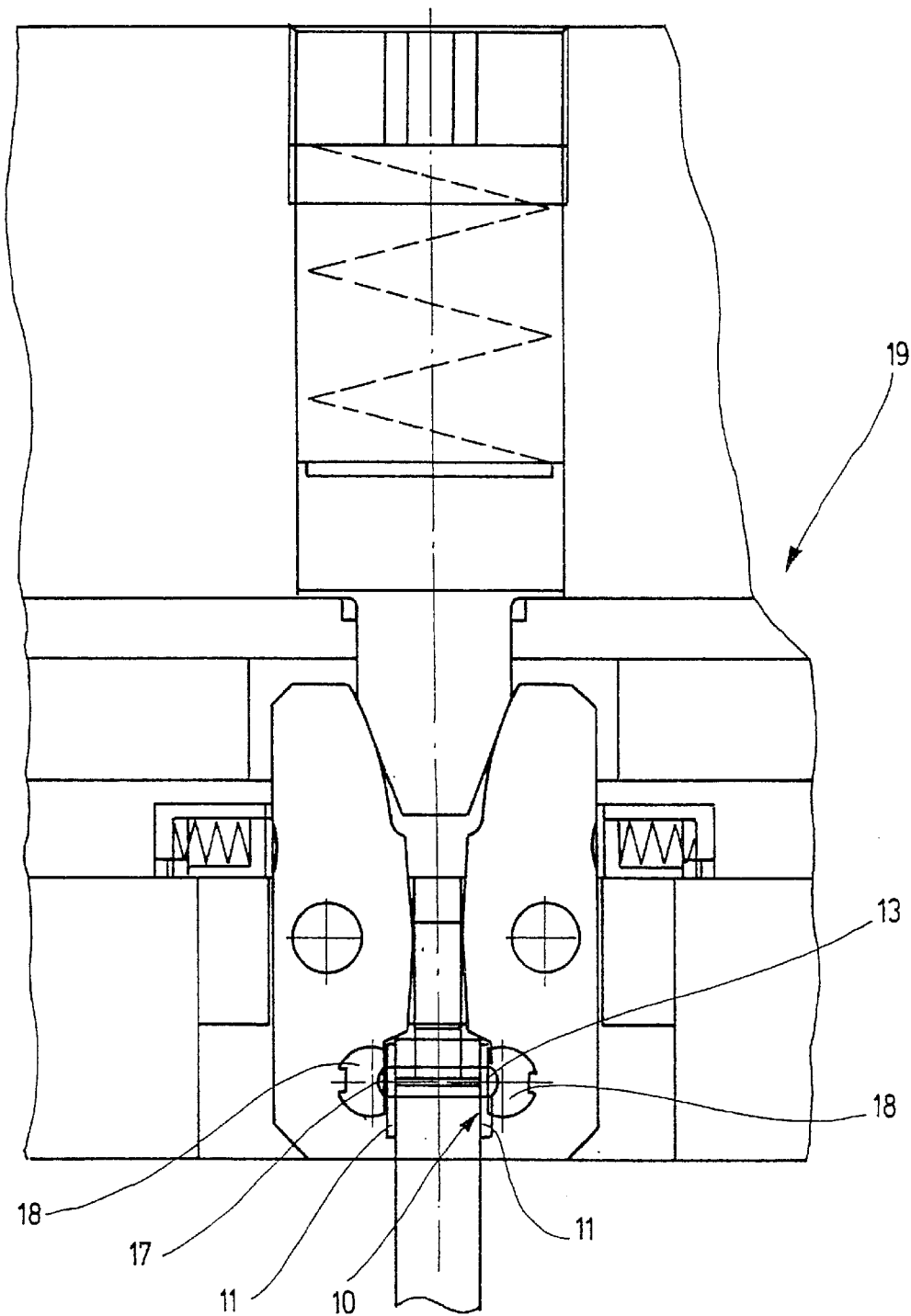
FIG. 7 is a schematic side view of the apparatus during the riveting of the rivet slug.

FIG. 7 shows deformation means 18 of the apparatus 19 for producing two rivet heads 17 on the rivet slug 15. The deformation means 18 consequently execute the riveting of the rivet slug 15 and are embodied as movable deformation elements 18 in the form of cups which can execute a wobbling motion in relation to a longitudinal axis of the rivet slug 15. The two ends of the rivet slug 15 protruding out from the through holes 12 are plastically deformed by the movable cups 18 of the apparatus 19, each forming a respective rivet head 17. The deformation of the ends of the rivet slug 15 preferably takes place by means of the wobbling process. To this end, the cups 18 execute an adjustable and controllable wobbling motion in relation to the ends of the rivet slug 15.

Figure 8:
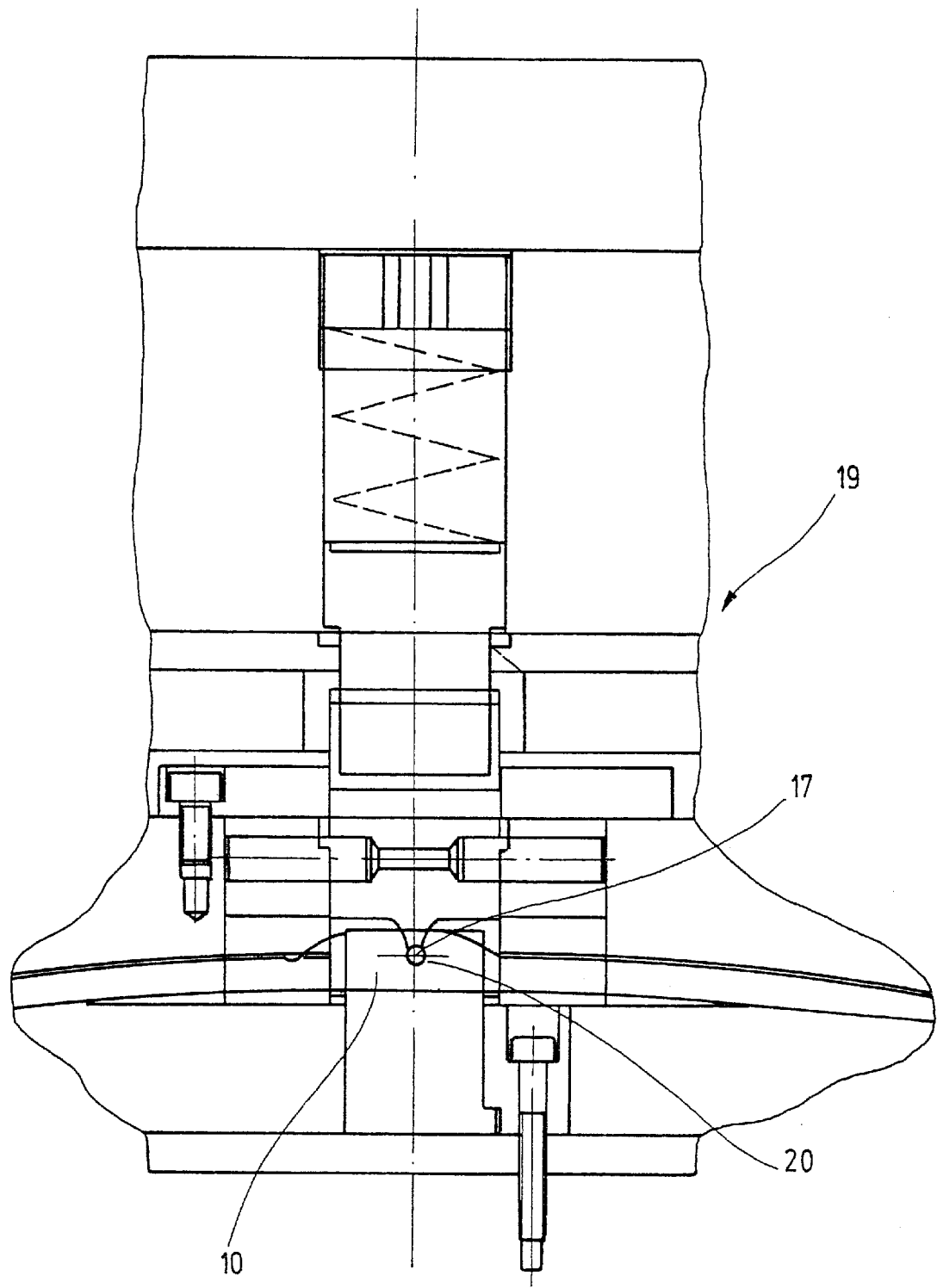
FIG. 8 is a schematic side view of the apparatus during the riveting, which is rotated by 90° in relation to FIG. 5.

FIG. 8 shows the apparatus according to FIG. 7 rotated by 90°. In order to prevent the rivet slug 15 from buckling during riveting, i.e. during the plastic deformation of the ends of the rivet slug 15 by means of the cups 18 executing a wobbling motion, the apparatus 19 has a core piece 20 (see FIG. 8). The core piece 20 stabilizes the shaft of the rivet slug 15 extending between the two legs 11 and consequently prevents an undesirable elastic and/or plastic deformation of the rivet slug 15 between the two legs 11. In this manner, the core piece 20 functions as a stabilization mechanism for the rivet part disposed between the legs 11 during the production of the rivet heads 17. Preferably, the core piece 20 extends over the entire shaft length of the rivet slug 15 between the legs 11 of the bracket 10 with the U-shaped cross section so that it rests in contact with the inside of the two legs 11 of the bracket 10 and consequently also effectively prevents undesirable elastic and/or plastic deformations of the legs 11 during the riveting of the rivet slug 15. The core piece 20 has a receiving seat that encompasses the shaft of the rivet slug 15 by approximately 180°.

According to the embodiment shown in FIG. 7, the two ends of the rivet slug 15 are plastically deformed by the two movable cups 18 simultaneously in a double wobble riveting process. After the production of the rivet 13, it is non-rotatably anchored in the through holes 12 of the legs 11 of the bracket 10 with the U-shaped cross section.

According to an embodiment that is not shown, the rivet slug 15 can also be already provided with a rivet head on one of its two ends, i.e. on the end which protrudes out from the bracket 10 after the legs 11 are folded to produce the U-shaped profile. According to this other embodiment, the entry bevel 16 of the corresponding upper die 23 comes into operative connection with the prefabricated rivet head and causes the rivet slug 15 to slide with its as yet unprocessed free end through the corresponding opposite through hole 12. Consequently, in order to produce the rivet 13, the rivet slug 15 is plastically deformed at only one end and only one movable cup 18 deforms the as yet unprocessed end of the rivet slug 15 to form a rivet head by means of a one-ended wobbling process.

The flat bracket blank 14 can be prefabricated in a separate section, i.e. punch-processed, or with a suitable embodiment of the apparatus 19 (additional disposition of corresponding punching tools), can also be pre-punched and then formed into a bracket 10 with a U-shaped cross section and a rivet 13 in a single station.

The cylindrical rivet slugs 15 can be rapidly and reliably supplied to the apparatus 19 in a vertical position by means of a vibrator that is not shown and can then be slid by means of suitable tools into one of the two through holes 12 of the rivet slug 15, forming a press fit.

It is consequently advantageously possible to execute work steps which were previously carried out in separate processing stations (folding of the legs, sliding of the rivet slug, positioning of the rivet slug) in a single station. The folding of the legs 11 to produce the U-shaped profile and the sliding of the rivet slug 15 into position extending through both through holes 12 consequently take place in a single work step in which the dies 22, 23 are simply moved toward each other in the direction of the arrows 25, 24. This represents a reduction in the number of work cycles and a simple, reliable, and rapid production of a bracket 10 with a U-shaped cross section and a rivet 13. It is possible to produce a bracket 10 with a U-shaped cross section and a stable rivet connection in a single apparatus. In addition, through the use of the stabilizing mechanism 20 (core piece), it is possible to produce a bracket 10 with thinner walls while maintaining the same stability.

What is claimed is:

1. A method for producing a windshield wiper bracket with a U-shaped cross section, with two through holes disposed in legs of the bracket, through which a rivet extends, wherein the method includes the following steps:

production of through holes (12) in a flat bracket blank (14);

insertion of a rivet slug (15) into one of the through holes (12);

folding of the legs (11) to produce a U-shaped profile and to thereby position the rivet slug (15) in a position aligned with the other through hole (12);

sliding of the rivet slug (15) into a position extending through both the through holes (12), and riveting of the rivet slug (15).

2. The method according to claim 1, wherein the rivet slug (15) is fixed in position in a bracket blank (14).

3. The method according to claim 2, wherein to fix the rivet slug (15) in position, it is pressed into the through hole (12) of the flat bracket blank (14), forming a press fit.

4. The method according to claim 1, wherein an entry bevel (16) in operative contact with a rivet edge (32) pushes the rivet slug (15) into the other through hole (12) of the U-shaped bracket (10) until the rivet slug (15) protrudes out from the through holes (12) with both of its ends.

5. The method according to one claim 1, wherein ends of the rivet slug (15) protruding out from a U-shaped bracket (10) are plastically deformed to produce respective rivet heads (17) by means of a wobbling process.

6. The method according to claim 1, wherein two ends of the rivet slug (15) are plastically deformed simultaneously.

7. The method according to claim 1, wherein during the plastic deformation of the two ends, the rivet slug (15) is stabilized in its shaft part between the legs (11).

8. An apparatus for producing a windshield wiper bracket with a U-shaped cross section, wherein the apparatus has folding means for producing a U-shaped profile out of a flat bracket blank, which is provided with two through holes, a positioning mechanism for sliding a rivet blank into the through holes, which are aligned with each other after the production of the U-shaped profile, and deformation means for producing at least one rivet head on a rivet slug, characterized in that the folding means (22, 23), the positioning mechanism (16), and the deformation means (18) are disposed in a single processing station.

9. The apparatus according to claim 8, characterized in that the folding means (22, 23) are embodied as dies (22, 23) which can be moved toward and away from each other in a linear fashion.

10. The apparatus according to claim 8, characterized in that the positioning mechanism (16) is embodied as an entry bevel (16) on one of the dies (22, 23).

11. The apparatus according to claim 8, characterized in that the deformation means (18) are embodied as movable deformation elements (18).

12. The apparatus according to claim 8, characterized in that the entry bevel (16) is embodied as a linear, straight guide edge (16).

13. The apparatus according to claim 8, characterized in that the deformation elements (18) are embodied as cups (18) which execute a wobbling motion.

14. The apparatus according to claim 8, characterized in that the apparatus (19) has a stabilization mechanism (20) for the rivet part disposed between the legs (11) of the U-shaped profile during the production of the rivet head (17).

15. The apparatus according to claim 8, characterized in that the dies (22, 23) are provided with a recess (27) in the pivot region of the rivet slug (15).

16. The apparatus according to claim 8, characterized in that the apparatus (19) is operatively connected to a vibrator which acts as a rivet slug supply.

17. The apparatus according to claim 8, characterized in that the apparatus (19) has a reference element (33) for exactly positioning the flat bracket blank (14) between the dies (22, 23).

* * * * *